Aug. 12, 1958     B. T. HENSGEN ET AL     2,846,767

APPARATUS FOR THE MECHANICAL CHEDDARING OF CHEESE

Filed Jan. 31, 1955     2 Sheets-Sheet 1

INVENTORS
BERNARD T. HENSGEN
WALTER H. BELAND
BY R. G. Story
ATTORNEY

Aug. 12, 1958 B. T. HENSGEN ET AL 2,846,767
APPARATUS FOR THE MECHANICAL CHEDDARING OF CHEESE
Filed Jan. 31, 1955 2 Sheets-Sheet 2

BERNARD T. HENSGEN
WALTER H. BELAND
INVENTORS

BY R. G. Story

ATTORNEY

United States Patent Office 2,846,767
Patented Aug. 12, 1958

2,846,767

APPARATUS FOR THE MECHANICAL CHEDDARING OF CHEESE

Bernard T. Hensgen and Walter H. Beland, Chicago, Ill., assignors to Swift & Company, Chicago, Ill., a corporation of Illinois Application January 31, 1955, Serial No. 484,922

6 Claims. (Cl. 31—48)

The invention relates in general to the manufacture of cheddar cheese. More particularly, this invention relates to an apparatus suitable for mechanically cheddaring cheese so as to secure substantially complete whey removal.

As ordinarily performed, the cheddaring of cheese is a batch process requiring a number of hand manipulations or the use of several different types of apparatus, each of which must be guided by an operator.

It is therefore an object of this invention to provide an improved means for cheddaring cheese in a largely automatic fashion.

It is a further object of this invention to provide an apparatus for the cheddaring of cheese which makes possible the accurate control of acidity, rate and amount of whey removed, and reduces the time required to complete the cheddaring operation.

A further object of this invention is to provide an apparatus which removes a large portion of the whey from the curd during the cheddaring operation by providing a large number of surfaces from which residual whey readily drains but which, at the same time, avoids the breakup of cheese curd into undesirably small particles.

Further objects and advantages of this invention, if not specifically set out, will become apparent during the course of the discussion below.

In the drawings:

Figure 3 is an isomeric view showing one of the plurality of curd receptacles used to hold the cheese. This figure also shows the apparatus by means of which the curd receptacles are vibrated.

Figure 5 is a view taken along the line 5—5 of the second curd subdividing mechanism of Figure 1.

Broadly, the present invention involves an apparatus for mechanically cheddaring cheese curd while the latter is held in a receptacle, preferably square or rectangular in shape, mounted on an endless conveyor. The conveyor moves each of these receptacles in intermittent fashion along a given path. As the conveyor stops for a predetermined period of time, operations are performed upon the curd at various stations along the conveyor path. At the first station, a curd receptacle, mounted on the above-mentioned conveyor is stopped beneath a second operatively associated conveyor from which depends a walled structure open at the bottom except for a plurality of cutting wires. This forming box, as it is called, and the curd receptacle are brought into registration and the conveyors briefly held in place. Then a quantity of curd and whey mix is drawn from a cheese curd vat and deposited on the curd receptacle. The curd receptacles are provided with drain slots that whey may easily drain free. Next, through the use of a suitable vibration supplying device, the curd receptacle is caused to vibrate, thereby increasing the rate of whey drainage. This vibration continues as the curd receptacle moves with the conveyor toward the second station. Here the previously mentioned plurality of wires, arranged at right angles to one another so as to resemble a lattice, subdivide the partially drained curd. This is accomplished as the forming boxes, approaching the end of their run, are lifted upward. The cutting wires are drawn through the curd mass thus providing a large number of curd faces and facilitating whey drainage. The receptacles continue to vibrate as they move forward to the third station where the final subdividing operation takes place. Again, wires or knives placed at right angles to one another perform the cutting operation. On the completion of this step, the receptacle supporting conveyor turns downwardly and begins its return trip to the feed end of the apparatus while the relatively small curd pieces fall from the tables, thereafter to be salted and pressed.

Figure 6:
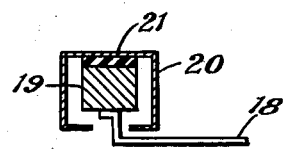
Figure 6 is an end view of the vibrator contact strips and their shields in section.

Referring now to the drawings in which like characters refer to like parts throughout; the apparatus comprises a conveyor mechanism preferably formed of sprocket chains 10 passing over sprocket wheels 11. The sprocket wheels located at the forward or feed end of the apparatus are connected by means of a Geneva drive mechanism 12 to chain 13 driven by motor 14. Mounted upon the conveyor are a plurality of vibration tables or curd-holding means 15, shown individually in Figure 3. Each are equipped with slots 16 at the lower portions thereof. These slots serve as whey drains. Additionally, each table is provided with a suitable vibrating apparatus 17, for example, one of the type described in the Alvard Patent No. 2,180,189. Power at the proper moment is supplied to these vibrating units through leads 18, which contact strips 19, mounted parallel to the conveyor and partially coextensive therewith. In order to prevent the contact strips 19 from being splashed with whey, thereby causing a poor contact between the leads 18 and strips 19, splash shields 20 are preferably supplied. Such a shield is shown in Figure 6. The shield should extend the full length of the contact strips and should be suitably insulated therefrom as by insulating material 21. The previously mentioned vibration tables 15 are mounted on the conveyor chain so that they vibrate rapidly when power is supplied to units 17. The vibration frequency which is considered most satisfactory is about 3600 per minute and the preferred amplitude ranges between 1/16 and 1/8 inch. Mounted directly beneath the uppermost portion of the main conveyor and extending almost its entire length is a drain pan 22. This serves as a receiving means for the whey which passes through slots 16 in vibrating tables 15. Suitable drain means 22a is provided to remove excess whey from the pan 22. Mounted beneath the entire conveyor are a plurality of separate nozzles 23, which are in turn connected to a pipe 24 carrying hot water or steam under pressure. These spray units are mounted within a separate chamber 25, having a drain 25a, and which is closed at both top and bottom and is provided only with openings 26 at either end. These openings are just large enough to allow passage of the conveyor and vibrating tables through the chamber.

Figure 1:
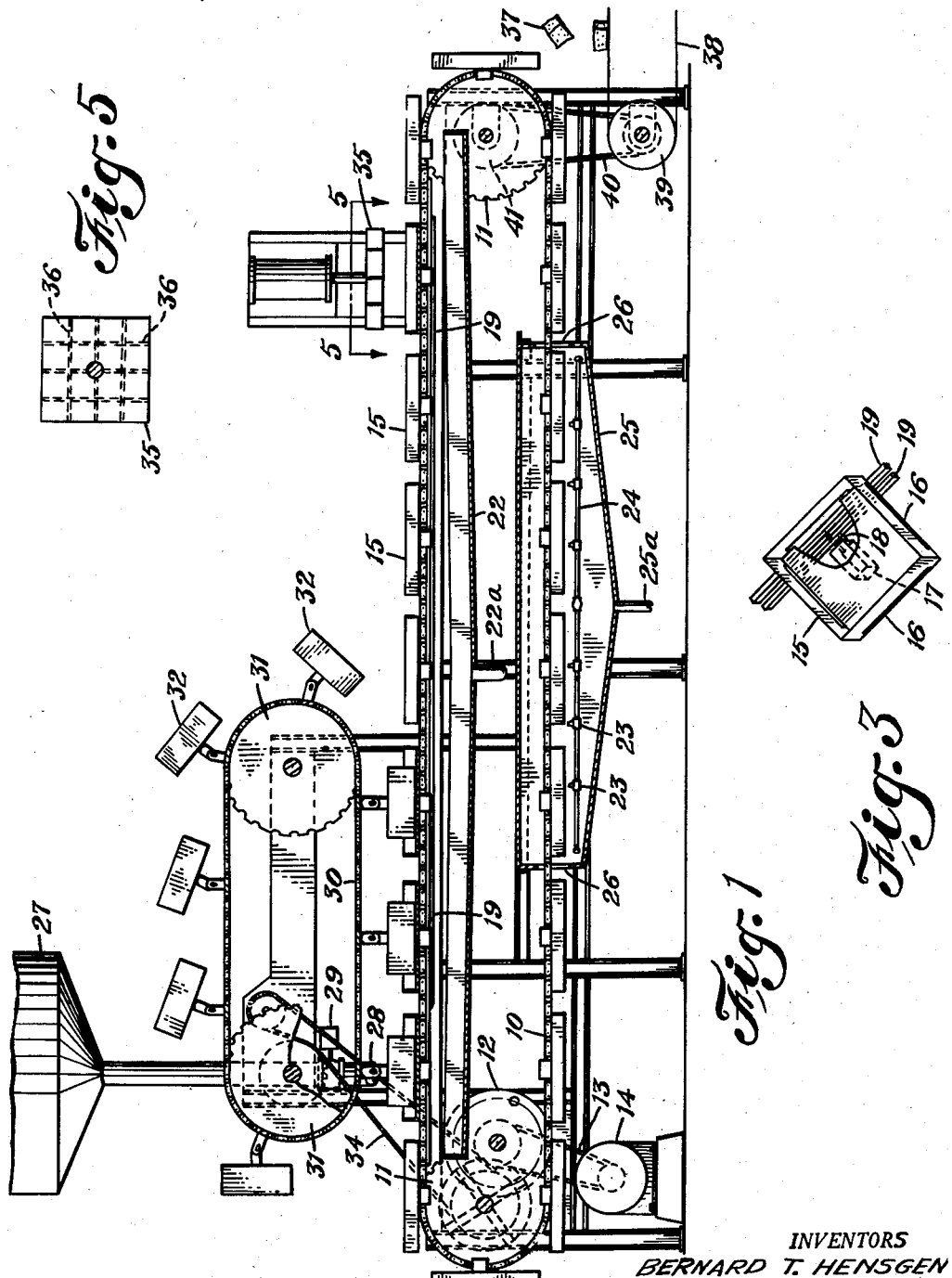
Figure 1 is a side-elevational view, the drain pans and several of the movable curd receptacles being shown in section.
Figure 2:
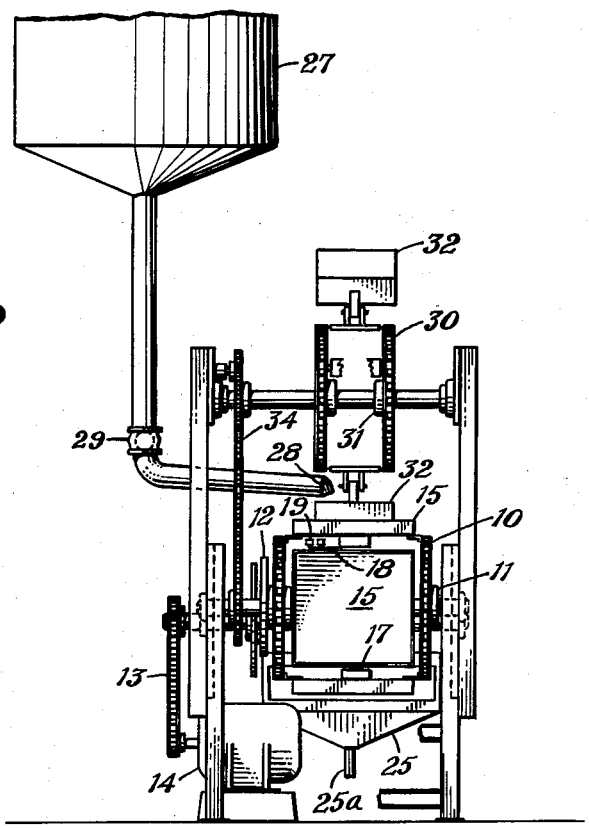
Figure 2 is an end elevational view of the entire apparatus.
Figure 4:
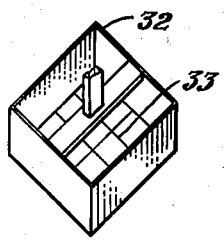
Figure 4 is an isometric view of the forming box and curd subdividing mechanism of Figure 1.

Mounted directly above the forward end of the conveyor is a cheese curd vat 27 having an extrusion nozzle 28. Additionally, a suitable solenoid operated valve 29 is positioned along the lower portion of the extrusion nozzle 28. This valve cooperates with the conveyor and vibrating tables in such a fashion that it is automatically tripped at a time when an empty table is positioned directly beneath the mouth of the extrusion nozzle. Provided also is a suitable time delay device, not shown, which holds the solenoid valve in an open position for a length of time sufficient to feed the proper amount of curd and whey onto the vibration table. Also mounted above the conveyor are sprocket chains 30 mounted on sprocket wheels 31. The chains carry a plurality of hingedly mounted forming boxes 32, each of which are open at both top and bottom. These forming boxes are more clearly shown in Figure 4 wherein the cutting wires 33 are easily seen. By means of the aforementioned Geneva drive mechanism connected through chain drive 34 and the axle of sprocket wheel 11 the movement of chain 30 is synchronized with that of the larger conveyor chain 10. The movements of the vibration tables 15 and forming boxes 32 are such that the two units become interconnected for a period of time. The cheese curds resting on the vibration tables are thus held in position by the boxes 32 while the initial surge of whey drains off. Positioned farther along the path of the main conveyor is a second unit 35 for subdividing curd. This cutting member is preferably a hydraulically driven mechanism having a plurality of cutting wires or knives 36 mounted at right angles to one another. This structure is shown more clearly in Figure 5. The movement of this member is synchronized with that of vibration tables in such a fashion that as chain 10 stops, cutting members 36 move in a downwardly direction to further subdivide the cheese curd. The cutting member returns to its retracted position just prior to the time at which the conveyor recommences its forward motion.

The pieces of curd are removed from each vibration table when the conveyor turns downward prior to beginning its strip to the feed end of the apparatus. The curd pieces 37 drop onto another conveyor 38 which advances them in a largely whey-free state to salting and pressing stations. This conveyor is preferably driven in an intermittent fashion through a suitable pulley 39 connected by means of chain drive 40 to another pulley 41, coaxially mounted with conveyor sprocket 11.

In operation, power is supplied to sprocket wheels 11 through Geneva drive 12 and chain 13 from electric motor 14. This causes sprocket chain 10 carrying vibration tables 15 to move intermittently in a forward direction. Simultaneously one of forming boxes 32, through the turning of sprocket wheel 31, is superposed directly over one of vibration tables 15. The solenoid valve 29 is tripped in such a fashion that cheese curd is automatically supplied from hopper 27 through extrusion nozzle 28 onto the appropriate vibration table. As can be easily seen from the drawings, the forming box is somewhat smaller than the curd receptacles and, since the curd and whey mixture is deposited within the four walls of the forming box, the mass is prevented from spreading out over the entire vibration table surface. Consequently, the drain slots 16 are kept free and excess whey is removed with ease. When the second station is reached, at the end of the shorter and uppermost conveyor, the forming boxes are lifted upwardly and the cutting wires drawn through the curd mass thereby subdividing it into a number of small cubes. Since at this point the curd has become partially set and to some extent whey free, it does not spread out upon the tables sufficiently to clog the drain slots.

Further separation of the whey is facilitated by the fact that the curd is now in smaller pieces—and additionally the tables are constantly being vibrated from the time they are filled at station one until they reach unit 35 at station three. Here at station three, each table stops beneath the knives or wires 36 to allow for a second cutting of the cheese curd. This further aids whey removal. At the end of the transverse run, the largely whey-free curd blocks 37 are dropped onto conveyor 38 which carries them to the salting station and to the forming and pressing station. The vibration tables are then immediately passed into spray chamber 25 through orifice 26 wherein they are subjected to the action of fluid under pressure supplied by pipe 24 to nozzles 23. In this fashion the pans are cleaned and prepared for the receipt of an additional mass of cheese curd.

It is seen that by the use of the apparatus set out above, it is possible to automatically drain and subdivide cheese curd with little or no attention from an operator. Accurate control of the rate of whey removal, acidity of the curd and size of the curd blocks is easily achieved. In short, a uniformity of product which has not been heretofore readily obtainable is secured.

Obviously, many modifications and variations of the invention as hereinbefore set forth may be made without departing from the spirit and scope thereof, and therefore only such limitations should be imposed as are indicated in the appended claims.

We claim:

1. A machine for the continuous manufacture of cheddar cheese, comprising: a frame, a conveyor mounted on said frame, a plurality of curd receptacles attached at spaced intervals on said conveyor, said receptacles provided with drains to remove released whey, drive means for advancing said conveyor and receptacles along a defined path, means for depositing portions of curd on the said receptacles at one station along said path, and cutting means at another station along said path to subdivide the curd to facilitate release of the whey.

2. A machine for the continuous manufacture of cheddar cheese, comprising: a first conveyor, a frame supporting said first conveyor, spaced curd-holding means attached to said first conveyor, a second conveyor positioned above said first conveyor, a plurality of curd forming conduits attached at spaced intervals on said second conveyor, means driving said first and second conveyors, the movement of said conveyors being so synchronized that said forming conduits on the second conveyor coincide with the curd-holding means of the first conveyor whereby curd from said forming conduits is deposited on the curd-holding means, curd charging means adjacent said forming conduits, means adjacent said first conveyor for cutting the curd deposited on said curd-holding means, and drain means beneath one run of first conveyor.

3. A machine for the continuous manufacture of cheddar cheese, said machine having a defined path and comprising: means including a plurality of forms for providing successive separate portions of cheese curd, movable support means cooperating with said forms for holding and moving said portions along said defined path, cutting means at spaced intervals along said path, and drain means beneath said support means.

4. A machine for mechanically cheddaring cheese, comprising: a frame, an endless conveyor mounted on said frame, drive means for intermittently moving said conveyor, a plurality of flat-surfaced curd supports mounted on said conveyor, means for supplying curd and whey to said supports at a point along the support path, a second and shorter endless conveyor mounted substantially directly above said conveyor, means for moving said shorter conveyor codirectionally wtih said first-mentioned conveyor, and a plurality of open end forming members mounted on said second-mentioned conveyor, each of said forming members having a grid-work of cutting surfaces, said second-mentioned conveyor being so synchronized with said first-mentioned conveyor that for a portion of the forward movement of said conveyors each of said forming members registers with and rests upon the flat surface of a curd support.

5. A machine for mechanically cheddaring cheese, comprising: a frame, an endless conveyor mounted upon said frame, drive means for intermittently moving said conveyor, a plurality of supports mounted on said conveyor, means for supplying curd and whey to said supports at a point along the support path, a second conveyor mounted adjacent said first conveyor, means for moving said second conveyor codirectionally with said first conveyor, a plurality of forming means mounted on said second conveyor, each of said forming means having a curd cutter, said second conveyor being synchronized for movement with said first conveyor whereby the forming means register with the curd supports, means for draining whey from the curd on said supports, and means for removing said curd from said supports after draining said whey.

6. A machine for the continuous manufacture of cheddar cheese, comprising: a frame, an endless conveyor mounted on said frame, curd supports attached at spaced intervals on said conveyor, forms adjacent said supports for intermittently depositing slabs of curd on said supports, cutting means for adjacent said conveyor, drain means associated with said supports for separating the whey from the cut curd, and means for recovering the curd from the conveyor after the whey is drained therefrom.

References Cited in the file of this patent
UNITED STATES PATENTS

| | | |
|---|---|---|
| 218,450 | Potter | Aug. 12, 1879 |
| 218,906 | Tyhurst | Aug. 26, 1879 |
| 2,174,658 | Hess | Oct. 3, 1939 |
| 2,263,173 | Johnson | Nov. 18, 1941 |
| 2,655,928 | Herold | Oct. 20, 1953 |
| 2,717,212 | Hensgen et al. | Sept. 6, 1955 |

OTHER REFERENCES

Department of Agriculture Bulletin No. 608, pp. 12 and 13.

UNITED STATES PATENT OFFICE
CERTIFICATE OF CORRECTION

Patent No. 2,846,767                                                        August 12, 1958

Bernard T. Hensgen et al.

It is hereby certified that error appears in the printed specification of the above numbered patent requiring correction and that the said Letters Patent should read as corrected below.

Column 1, line 48, for "isomeric" read -- isometric --; column 4, line 44, before "first" insert -- said --.

Signed and sealed this 4th day of November 1958.

(SEAL)
Attest:

KARL H. AXLINE                                                     ROBERT C. WATSON

Attesting Officer                                               Commissioner of Patents